Aug. 18, 1959     E. K. JONES     2,900,238
APPARATUS USEFUL FOR LIQUID-LIQUID CONTACTING
Filed Dec. 24, 1956
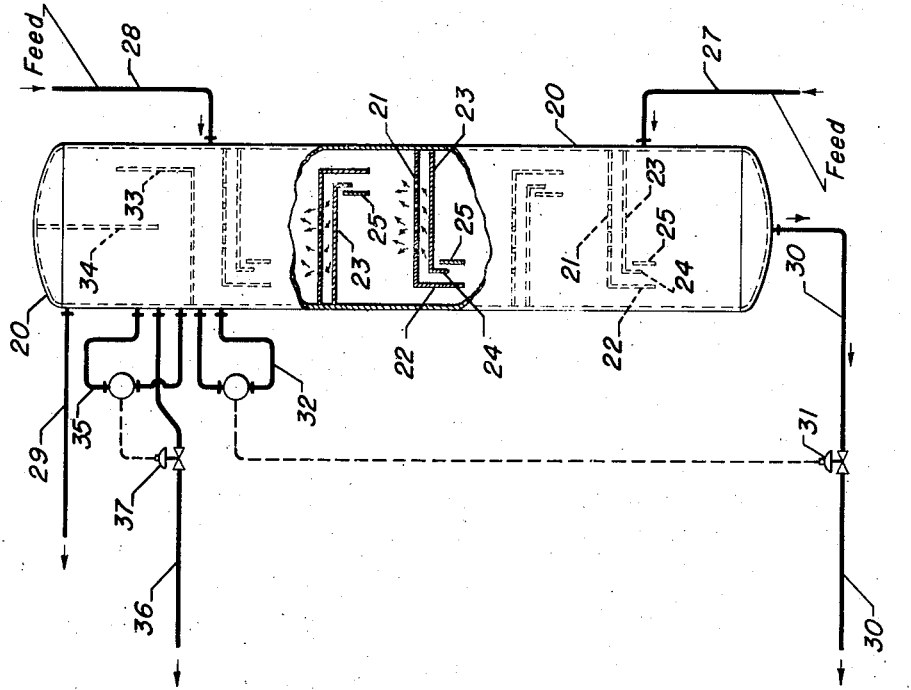
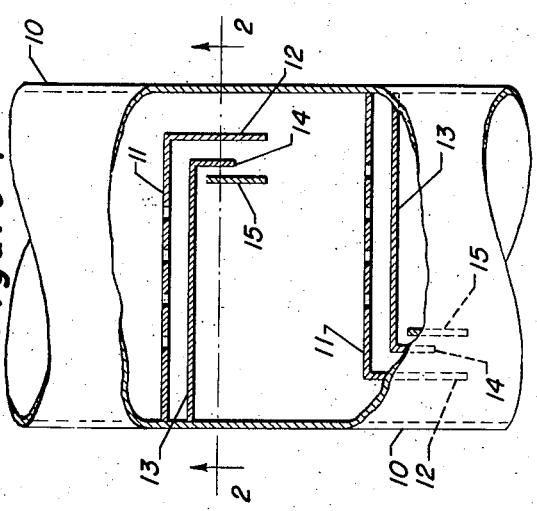
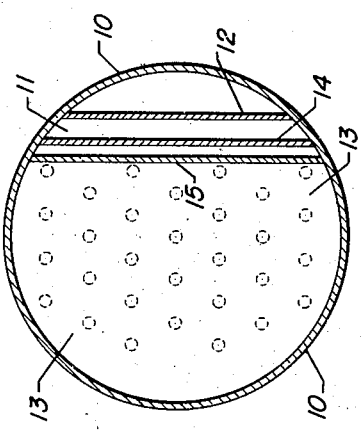
INVENTOR:
Edwin K. Jones
BY:
Chester J. Giuliani
Glen R. Grunewald
ATTORNEYS:

United States Patent Office 2,900,238
Patented Aug. 18, 1959

2,900,238

APPARATUS USEFUL FOR LIQUID-LIQUID CONTACTING

Edwin K. Jones, Kenilworth, Ill., assignor, by mesne assignments, to Universal Oil Products Company, Des Plaines, Ill., a corporation of Delaware Application December 24, 1956, Serial No. 630,118

4 Claims. (Cl. 23—270.5)

This invention relates to an apparatus useful for effecting contact between two immiscible liquids and particularly to an apparatus which provides, in a multi-stage liquid-liquid contacting process, constant inventories of liquids within each contacting zone and a quiescent zone in each stage for disengaging of the liquids in contact.

Liquid-liquid contacts are very useful for extracting a component from one liquid and transferring it into another liquid which is substantially immiscible with the first. Processes such as this are employed to recover a useful product such as, for example, the removal of aromatic compounds from hydrocarbon mixtures. Processes such as this are also used to provide a superior raffinate, or phase from which the material is extracted as in scrubbing operations wherein impurities or discoloring components are removed from a liquid by transferring them to a different liquid phase.

In liquid-liquid contacts, it is desirable to intimately commingle small particles of one liquid by dispersing them in a body of another liquid so that good contact is effected and, therefore, efficient transfer of material from one phase to the other. Obtaining this intimate contact is one problem, however, another problem is disengaging the liquids in contact so that they may be removed separately from the contacting zone. The latter problem is particularly bothersome when multi-stage countercurrent liquid-liquid contact is effected as in a contacting column containing a series of equilibrium contacting stages wherein one liquid is alternately dispersed in and disengaged from another liquid in each of a series of contacting zones. It is an object of this invention to provide a novel apparatus which promotes intimate and efficient countercurrent contact of one liquid with another substantially immiscible liquid and furthermore, provides constant inventories of each liquid in each stage, a quiescent zone for disengaging of the liquids and a means for withdrawing disengaged liquid from a zone and redispersing it in the subsequent zone.

In order to perform these functions, it is an embodiment of this invention to provide a tray assembly for use in a column which comprises in combination two spaced parallel horizontal plates, perforations in one of said plates, first conduit means extending from a distance beyond the imperforate plate through both of said plates, second conduit means extending from a lesser distance beyond said imperforate plate than said first conduit means to the space between said plates and baffling means out of continuous contact with said imperforate plate extending from a point farther beyond said imperforate plate than said second conduit means to a point a lesser distance beyond said imperforate plate than said second conduit means with said baffling means placed to shield the opening of said second conduit means.

It is another embodiment of this invention to provide a multi-stage liquid-liquid contacting column comprised of a vertically elongated shell containing a plurality of the above described tray assemblies.

This invention may be better described in conjunction with the accompanying drawing which illustrate in Figure 1 a sectional view of one tray assembly, in Figure 2 a sectional view along line 2—2 of Figure 1 and in Figure 3 a schematic diagram of a column containing several of such tray assemblies.

Referring to Figure 1, there is shown a part of a vertical shell 10 which encloses the entire column containing a number of tray assemblies. Each tray assembly is comprised of a perforate plate 11 containing a conduit means which here is shown as partition 12 and an imperforate plate 13 containing conduit means which is here shown as the space between a partition 14 and said partition 12. The conduit means in this particular illustration are formed in one case between the shell 10 of the column and a partition 12 and in the other case between the partitions 12 and 14, however, it is to be understood that any conduit means may be employed such as tubes extending through the various plates rather than the chord-shaped and slot-like conduits herein shown. The tray assembly also is provided with a baffle 15 which shields the opening to the conduit passing between plates 11 and 13 as is here shown extending from a distance slightly below imperforate plate 13 to a distance farther below it than the extreme of partition 14. In operation, placed with the partitions extending downwardly, the less dense of the two immiscible liquids in contact will be dispersed as droplets through the perforations in plate 11 into the more dense phase immediately above plate 11 and will rise through that phase and collect as a pool beneath the next higher plate 13. The pool beneath plate 13 will be as deep as partition 14 extends downwardly and when additional less dense phase is added to the pool by virtue of the rising droplets collecting beneath imperforate plate 13, settled quiescent less dense phase will be discharged from the pool by passing above partition 15, below partition 14, through the conduit means between partitions 14 and 12 and into the space between plates 11 and 13. This action will cause sufficient increased pressure to force droplets of less dense material through the perforations thereby dispersing them into the next stage for further contact with additional quantities of more dense phase.

The more dense phase in this embodiment is the continuous phase and it will pass as a continuous stream from above plate 11 through the conduit formed by partition 12 and outer shell 10 and into the next lower stage. Contact is effected by the dispersion of small droplets of less dense phase or discontinuous phase in the continuous stream of more dense phase.

As may be seen, the pool of material beneath the imperforate plate 13 forms an inventory of material so that the passage of less dense phase through each stage is slower, each droplet having to become a portion of the pool, to pass through the quiescent zone and a tortuous path before being redispersed. This inventory of material provides a disengaging space for the mixture of phases and a substantial time lag for disengaging before the discontinuous or dispersed phase is passed to the next stage. This time lag or the depth of the quiescent zone may readily be regulated by merely regulating the length of partition 14. The quiescent zone causes complete disengagement of the phases before they are passed to subsequent zones and thus prevents recirculation of material back to stages from which it came with its known adverse effects.

Although this invention has been described with relation to a dispersed less dense phase and a continuous more dense phase, it is equally applicable to the opposite situation, therefore, when it is desired to disperse the more dense phase in the less dense phase, an upside down variation of this tray assembly may be employed.

The upside down variation comprises a lower perforated plate with a partition extending upwardly and a higher imperforate plate with a partition extending a lesser distance upwardly forming an opening to the space between the plates. Again, a baffle will shield the opening and extend both higher and lower than the partition from the imperforate plate but out of contact with the imperforate plate. In this embodiment, droplets of more dense phase will pass through the perforations, will be mixed with a continuous stream of less dense phase, will collect above each perforate plate ultimately disengaging from the less dense phase flowing beneath the baffle member and then up and over the partition extending from the imperforate plate. The more dense phase will then pass between the plates and be forced through the perforations in the lowermost plates to be redispersed in less dense phase in the next lower contacting stage.

Referring to Figure 3, there is illustrated a column containing a series of contacting stages, each set off by tray assemblies of this invention. This series of contacting stages is arranged so that the more dense and less dense phases are alternately contacted and separated in a countercurrent manner in a sequence of stages contained in a cylindrical vertical vessel 20. As in the previous description, each stage is comprised of a pair of spaced plates. Plate 21 herein shown as the upper plate is perforated while plate 23 herein shown as the lower plate is imperforate. Plate 21 terminates in a partition 22 sealed to the walls of chamber 20 to form a conduit suitable for passing fluid from a contacting stage to the next lower contacting stage. Imperforate plate 23 terminates in a partition 24 which also is sealed against the sides of chamber 20 to form a conduit means passing from the space immediately below plate 23 to the space between plates 23 and 21. Partition or baffle 25 shields the opening to the latter described conduit and is in effect a skimming device which prevents the mixed-phase interface from entering the conduit means formed between partitions 24 and 22.

The column functions by introducing the less dense phase through feed conduit 27 and the more dense phase through feed conduit 28. The less dense phase passes between the parallel plates of each tray assembly, is dispersed in the more dense phase passing downwardly through the column as a continuous zigzag stream, disengages from the more dense phase beneath each higher plate, passes again between the parallel plates of that tray assembly and is redispersed again in the next higher stage. This procedure continues until the top stage is reached in which some means for disengaging the less dense from the more dense phase is available and the contacted less dense phase is discharged through line 29. In this particular embodiment, the top disengaging means is shown as an L-shaped baffle 33 in conjunction with a vertical baffle 34 sealed against the top of the column and extending downwardly. These baffles cause the less dense phase to pass through a tortuous path from the last contacting stage to discharge conduit 29 and permits the settling of entrained more dense phase above baffle 33. There is shown here a level control 35 which will maintain the interface of more dense phase on baffle 33 by opening and closing valve 37 responsive to variations in the interface so that an excess of more dense phase may be discharged through line 36.

The more dense phase passing down the column through a zigzag path between each tray assembly ultimately accumulates in the bottom of the column and is discharged through line 30. The rate of discharge through line 30 may be regulated by the opening of valve 31 which may be controlled responsive to variations in the interface of more dense phase on the uppermost tray assembly in the column. This method is illustrated here by liquid level control means 32 which controls the setting of valve 31, however, it is to be emphasized that this represents merely one means for controlling a column such as this and it is not intended to limit this invention to this specific control method.

The essential elements of this invention are the existence in each tray assembly of two parallel spaced plates, one of which is perforated and the other imperforate with conduit and baffling means disposed so that the flow of the dispersed phase liquid passes from the quiescent zone on the imperforate plate side of the assembly to the space between the plates. The conduit and baffling arrangements may be any of those commonly employed in the art so long as the shielding or skimming baffle is positioned to cause the dispersed phase to flow from the most quiescent portion of the inventory around the baffle and into the conduit passing between stages without encountering the interface between stages. Similarly, the perforations may comprise simple holes or they may consist of slots, bubble caps, or other contact-producing dispersing devices.

I claim as my invention:

1. In a contacting column, the combination of a pair of vertically spaced, horizontal plates within the column and forming upper and lower contacting zones in the column, one of said plates being perforated and the other being imperforate, and the perforated plate being of larger cross-sectional area than the imperforate plate, first conduit means in a side portion of the column extending in a vertical plane beyond the imperforate plate and connecting said upper and lower contacting zones, second vertical conduit means in said side portion of the column between the extremity of the imperforate plate and said first conduit means, and connecting one of said zones with the space between said plates, and vertical baffling means adjacent said second conduit means and spaced vertically from the imperforate plate and positioned in said one zone to shield the opening of the second conduit means.

2. In a contacting column, the combination of a pair of vertically spaced, horizontal plates within the column and forming upper and lower contacting zones in the column, one of said plates being perforated and the other being imperforate, first conduit means extending in a vertical plane through the plates at a side portion of the column and connecting said upper and lower contacting zone, second vertical conduit means in said side portion of the column contiguous to and nearer the center of the column than said first conduit means and connecting one of said zones with the space between said plates, and vertical baffling means adjacent said second conduit means and spaced vertically from the imperforate plate and positioned in said one zone to shield the opening of the second conduit means.

3. In a contacting column, the combination of a pair of vertically spaced, horizontal plates within the column and forming upper and lower contacting zones in the column, one of said plates being perforated and the other being imperforate, both said plates terminating short of a portion of the side wall of the column and the perforated plate extending closer to said side wall portion than the imperforate plate, a partition extending vertically from the extremity of the perforated plate and forming with said side wall portion a vertical conduit connecting said contacting zones, a second partition extending vertically from the extremity of the imperforate plate and forming with the first-mentioned partition a second vertical conduit connecting one of said zones with the space between said plates, and a vertical baffle in said one zone adjacent said second partition and spaced vertically from the imperforate partition and extending beyond the end of said second conduit in the last-named zone to shield the opening of the second conduit.

4. In a contacting column, the combination of a pair of vertically spaced, horizontal plates within the column and forming upper and lower contacting zones in the column, one of said plates being perforate and the other being imperforate, both said plates terminating short of a portion of the side wall of the column and the perforated plate being above and extending closer to said side wall portion than the imperforate plate, a partition extending vertically downward from the extremity of the perforated plate and forming with said side wall portion a vertical conduit connecting said contacting zones, a second partition extending vertically downward from the extremity of the imperforate plate and forming with the first-mentioned partition a second vertical conduit connecting the lower contacting zone with the space between said plates, and a vertical baffle in said lower zone adjacent said second partition and spaced vertically from the imperforate partition and extending downwardly beyond the lower end of said second conduit to shield the lower open end of the second conduit.

References Cited in the file of this patent

UNITED STATES PATENTS

| | | |
|---|---|---|
| 2,271,462 | Pfennig | Jan. 27, 1942 |
| 2,669,505 | Rhys et al. | Feb. 16, 1954 |
| 2,717,854 | Felix | Sept. 13, 1955 |